United States Patent [19]
Runaldue

[11] Patent Number: 6,160,436
[45] Date of Patent: Dec. 12, 2000

[54] DRIVER WITH SWITCHABLE GAIN

[75] Inventor: Thomas J. Runaldue, San Jose, Calif.

[73] Assignee: Advanced Micro Devices, Inc., Sunnyvale, Calif.

[21] Appl. No.: 09/281,905

[22] Filed: Mar. 31, 1999

Related U.S. Application Data

[60] Provisional application No. 60/082,183, Apr. 17, 1998.

[51] Int. Cl.$^7$ .................................................. H03K 17/62
[52] U.S. Cl. ......................... 327/407; 327/403; 330/228
[58] Field of Search ........................... 327/543, 407–413, 327/538, 403–404; 323/315; 330/288

[56] References Cited

U.S. PATENT DOCUMENTS

| | | | |
|---|---|---|---|
| 3,855,541 | 12/1974 | Leidich | 330/288 |
| 5,363,065 | 11/1994 | Dufour | 330/288 |
| 5,781,060 | 7/1998 | Sugawara | 327/407 |

OTHER PUBLICATIONS

Breyer et al., "Switched and Fast Ethernet: How It Works and How to Use It", Ziff–Davis Press, Emeryville, California, 1995, pp. 60–70.

Johnson, "Fast Ethernet: Dawn of a New Network", Prentice–Hall, Inc., 1996, pp. 158–175.

*Primary Examiner*—Toan Tran

[57] ABSTRACT

A driver having a switchable gain including a first circuit connected to a potential source, an input node receiving an input current, and an output node and operable in both low and high transmission frequency modes, and a second circuit connected to the potential source and a node of the first circuit and operable in only the high transmission frequency mode. In the low transmission frequency mode, the potential source is at a first level and the first circuit receives the input current and provides a first output current with a first current gain to the output node. In the high transmission frequency mode, the potential source is at a second, lower level and the first and second circuits receive the input current and provide a second output current, less than the first output current, with a second current gain, lower than the first current gain, to the output node.

21 Claims, 7 Drawing Sheets

DRIVER WITH SWITCHABLE GAIN

This invention claims priority from provisional Patent Application Serial No. 60/082,183, filed on Apr. 17, 1998, entitled "Quad Fast Ethernet Transceiver For 10 Base-T/100 Base-X (QFEX 10/100)" the entire disclosure of which is incorporated by reference herein.

TECHNICAL FIELD

The present invention relates to network transmission, and more particularly to a novel network line driver in which gain of a current source is switchable in order to be compatible with both a 10-BASE-T and 100-BASE-TX Ethernet transmission medium.

BACKGROUND ART

A Local Area Network, or (LAN), is a communications systems that provides a connection among a number of independent computing stations within a small area, such as a single building or group of adjacent buildings. One type of network structure uses one or more repeaters in a star topology, with each repeater having several ports. A data packet received at one port is retransmitted to all other ports of the repeater. Each repeater in turn restores timing and amplitude degradation of data packets received at one port and retransmits the packets to all other ports.

Traditional Ethernet networks (10 BASE-T) operate at 10 Mb/s Ethernet protocol, as described by IEEE Standard 802.3; the majority of Ethernet interfaces currently operate at this data rate. However, a newer Ethernet standard, under IEEE standard 802.3 u, accomplishes the faster operation of 100 BASE-T systems, at a 100 Mb/s data rate (i.e., a 125 Mb/s encoded bit rate) using unshielded twisted pair (UTP) physical media. The 100 BASE-T standard defines operation over two pairs of category 5 UTP (100 BASE-TX) and over four pairs of category 3 UTP. The 100 BASE-FX network medium, covered by the 100 BASE-T standard, allows operation over dual fiber optic cabling.

Ethernet protocol provides for a Media Access Control (MAC), enabling network interface devices at each network node to share accesses to the network medium. One type of connection, termed a Media Independent Interface, or MII, connects the MAC to a physical layer (PHY) transceiver configured for a particular network medium, e.g., 10 BASE-T, 100 BASE-FX, or 100 BASE-TX. The physical layer transceiver is configured for converting the MII protocol signals output by the MAC into analog network signals, such as Multiple Layer Transition-3 (MLT-3) signals for 100 Mb/s Ethernet networks, or Manchester-encoded signals for 10 Mb/s Ethernet networks. (Networks often use several PHY devices operating over different media types.) Included in such transceiver is an autonegotiation unit that determines the speed of operation of the link partner on the network medium using well-known auto-negotiation techniques. Additional details regarding autonegotiation are disclosed in Breyer et al., "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175.

Figure 1:
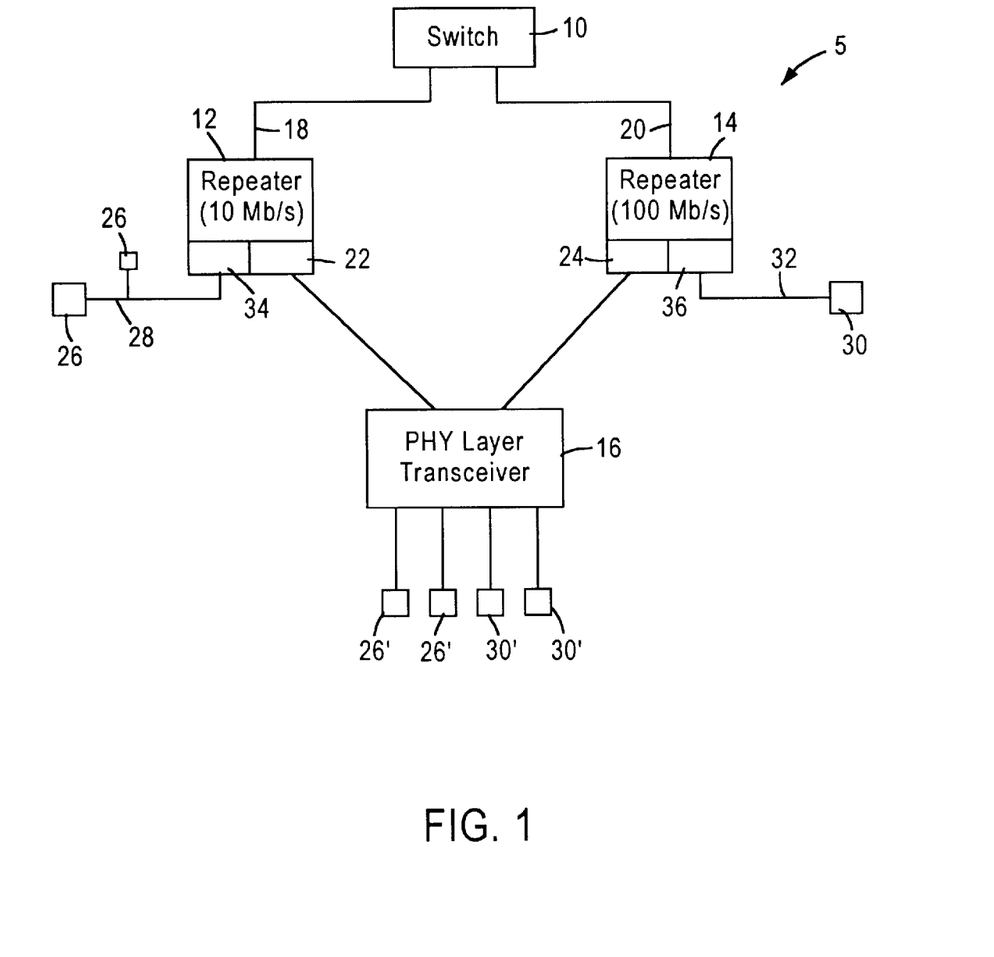
FIG. 1 is a block diagram of exemplary local area network architecture for transporting network data at different data rates.

FIG. 1 is a block diagram of an exemplary LAN architecture which can transport network data at different data rates. As shown in FIG. 1, the network 5 includes a network switch 10, a repeater 12 operating at a first data rate such as 10 Mb/s, a second repeater 14 operating at a second data rate such as 100 Mb/s, and a multiple port physical layer transceiver 16. The switch 10 and the repeater 12 transfer network data via a data link 18 operating at the first data rate of 10 Mb/s. The switch 10 and the repeater 14 transfer data via a different data link 20 operating at the second data rate of 100 Mb/s. The repeaters 12 and 14 transfer data to and from the network transceiver 16 via repeater interfaces 22 and 24 operating at 10 Mb/s and 100 Mb/s, respectively. As recognized in the art, the repeater 12 may also transfer network data to individual network workstations 26 operating at 10 Mb/s via a shared medium 28, and the repeater 14 may transfer data to network workstations 30 operating at 100 Mb/s via a network medium 32. Transceiver 16 is a multiple port physical layer transceiver which enables multiple workstations 26', 30' having different data rates of 10 Mb/s and 100 Mb/s, respectively, to be connected to a single PHY unit for communication with the repeater interfaces 22 and 24.

The transceiver 16 includes a driver stage which imparts an analog waveform onto a network medium, right before a magnetic transformer. The driver stage of the transceiver 16 receives an output of a digital to analog converter (DAC) serving as a current source, and amplifies the current like a class AB type amplifier; i.e. push-pull type of circuit. Since the driver stage must drive both the 10 BASE-T and 100 BASE-TX standard, the same impedance will be driven with the same termination whether in 10 BASE-T or 100 BASE-TX mode.

Figure 2:
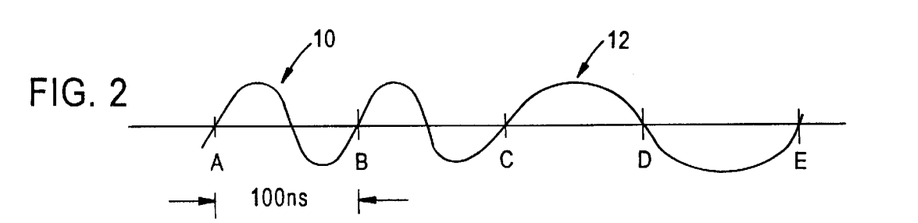
FIG. 2 is an exemplary 10 BASE-T waveform.

For the 10 BASE-T mode, approximately 2.5 volts (actually 1.8 volts) has to be driven and the maximum frequency of the waveform is 10 MHz. The waveform is composed mostly of sine waves; i.e., it has a very smooth sinusoidal type output. A 10 BASE-T waveform is shown in FIG. 2, and can drive a series of nodes. This waveform includes 10 MHz and 5 MHz pules characterized by Manchester data and needs to be generally smooth. The waveform varies between 5 MHz and 10 MHz impulses because the digital aspect of a Manchester waveform is that there is a coding such that there is always a transition (e.g., zero crossing) in the middle. A rising transition is characterized as a "1", and a falling transition is characterized as a "0". When a series of "1s" are transmitted in a row, there will be a 10 MHz waveform 10 as shown at points A, B and C of FIG. 2. However, as a transition to a "0" occurs at point D, the waveform between points C and D will continue as a 5 MHz waveform 12. If the end transition at point E is a "1", the waveform will remain a 5 MHz pulse so it starts to resemble a 5 MHz pulse rather than a 10 MHz pulse, but the waveform is a combination of "1s" and "0s". If all "0s" or all "1s" are transmitted, 10 MHz pulses are obtained. If a combination of "1 0 1 0" is transmitted, the waveform will appear as 5 MHz pulses.

Figure 3:
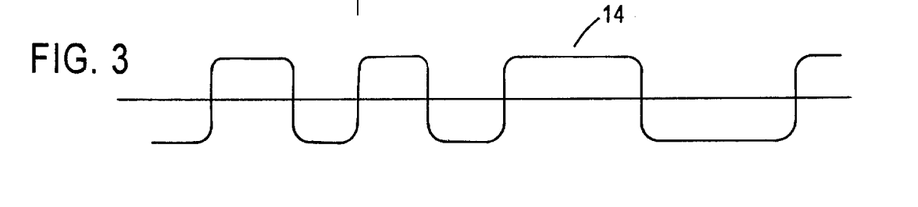
FIG. 3 is the waveform of FIG. 2 after being contoured.

An objective in transmitting Manchester data is not to convert the pulses into complex digital waveforms having very sharp edges. Consequently, there will be a function to smooth and precondition the waveform to compensate for line characteristics of filtering high frequency components more than low frequency components, i.e., de-emphasize the low frequency components which is the 5 MHz waveform. Thus, the signal of FIG. 2 needs to be contoured relative to the line of the transmission medium to that of signal 14 of FIG. 3. In addition, the Manchester output needs to be filtered so that each step in the waveform 14 is a 5 nanosecond (ns) step. Thus, there is a digitizing resolution of sampling at 5 ns resulting in 20 samples per 100 ns period of the 10 MHz waveform 10.

Figure 4:
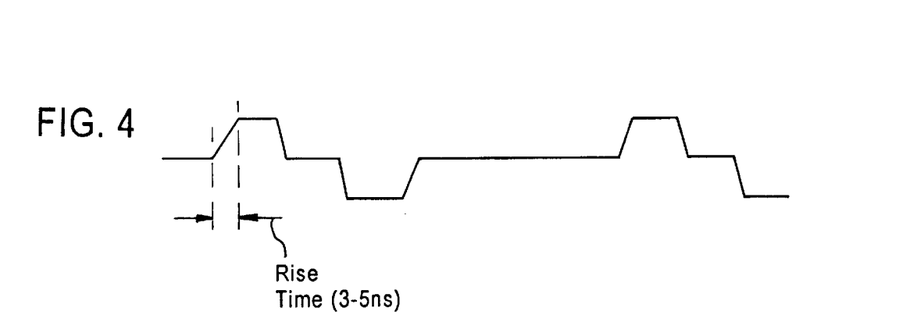
FIG. 4 is a MLT-3 waveform of the waveform of FIG. 2.

In the 100 BASE-TX mode, about 1 volt has to be driven as compared to about 2.5 volts for the 10 BASE-T mode, and an MLT-3 waveform is used. A MLT-3 (100 MHz) is shown in FIG. 4 and is basically a three-level waveform (digital waveform) converted from Non-Return to Zero Interface (NRZI) data. The waveform has certain rise time and fall time constraints depending whether the signal is transitioning from a "0" to a "1", or a "1" to a "0", and the level of the signal. When a signal is converted from NRZI to MTL-3, every time there is a "1" in NRZI, the MLT-3 signal makes a transition. If there is a "0", then there is no transition. The data in 100 BASE-TX mode is basically 125 MHz serial data which corresponds to 8 ns. Thus, the MLT-3 waveform has a transmit sampling point every 8 ns. Each sampling point is capable of generating a transition going from "0" to "1", or "1" to "0". Therefore, each time there is a transition in FIG. 3, there is a sampling.

Since the data in 100 BASE-TX mode is basically 125 MHz serial data, a driver in the driver stage has to be able to transition from "0" to "1" with a rise time between 3 to 5 ns. Consequently, there is a fairly abrupt change in the edge rate between 3–5 ns. With MLT-3 voltages, the edge rates and transitions are much faster that what is needed in the 10 BASE-T mode. The faster the edge rates are in the 10 BASE-T mode, the more discontinuity there is since, when the edge rate exceeds a certain value, there are excess harmonics (ringing) at the upper frequency range.

Thus, in the 100 BASE-TX mode with MLT-3, a driver in the driver stage needs to have a fast response as compared to the 10 BASE-T mode with Manchester data where the driver stage needs to have a slower response to avoid harmonics. In addition, in the 10 BASE-T mode, a driver of the driver stage needs more gain (capable of driving a larger amount of voltage) than in the 100 BASE-TX mode. Thus, in the 10 BASE-T mode, important factors for a driver of the driver stage are a high gain and a slow response, whereas in the 100 BASE-TX mode, important factors for a driver of the driver stage are low gain, but a fast response. Consequently, the important factors for transmitting data in 10 BASE-T mode and 100 BASE-TX mode are opposite each other.

Figure 5A:
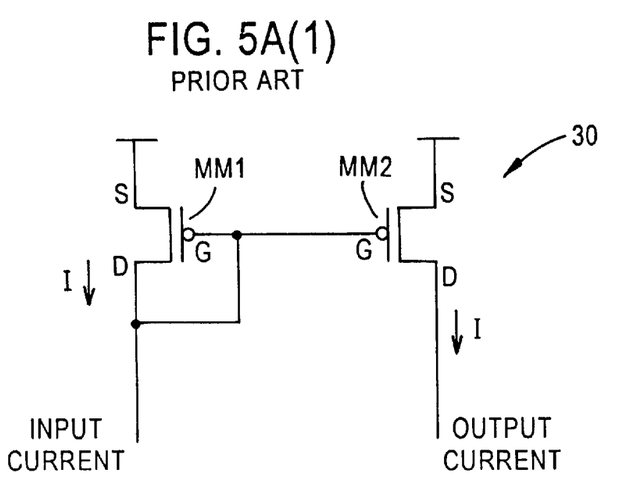

A conventional driver is shown in FIG. 5A(1) and comprises current mirror 30 formed of MOS devices. Current mirror 30 is a moving current mirror which converts current to voltage and then voltage back into current. In the current mirror 30, imparting a certain voltage on the gate (G) of transistor MM1 causes certain current to flow from the source (S) to the drain (D) of transistor MM1. Since the gate (G) of transistor MM1 is tied to its drain (D) and to the gate (G) of transistor MM2, the same gate to source voltage imparted on transistor MM1 is similarly imparted on transistor MM2.

The conventional driver 30 amplifies current because of the high current drive requirements of a network driver. More specifically, there is a need to amplify a small current that is present in the driver chip (5 or 6 milliamps for the "high" analog current) to 70–80 milliamps of current on the output. In the 10 BASE-T mode, the driver current gain should be 1:16, while in 100 BASE-TX mode, the driver current gain should be 1:8, half that of the 10 BASE-T mode.

Figure 5B:
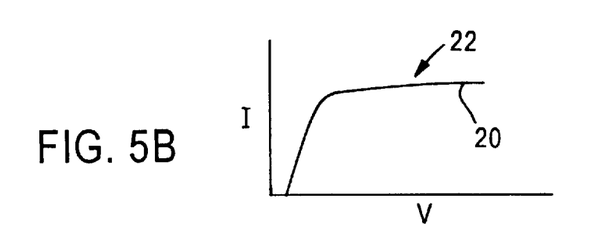
FIG. 5B is a graph plotting current vs. voltage for the transistors in the current mirror circuit of FIG. 5A.

Referring to the current (I) vs. voltage (V) curve shown in FIG. 5B, both MM1 and MM2 of driver 30 need to be operating in the saturation region 22 (nonlinear region) on the curve 20 so that the drain source voltage $V_{DS}$ will be $-V_T$ above the gate source voltage $V_{GS}$. This condition is important so that the drain voltage $V_D$ does not rise so far that it starts falling off the flat region 22. In this flat region 22 of the I–V curve, a certain amount of current is obtained when a certain amount of gate voltage is imparted. Referring back to FIG. 5A(1), the current mirror 30 operates as follows. When current (I) flows out of transistor MM1, a certain gate to source voltage is established to supply this current, i.e., the voltage will fall to a level which sustains the amount of current flowing out of the transistor. When this voltage level is reached, the gate to source voltage established for transistor MM1 will be imparted on the gate of transistor MM2. If transistors MM1 and MM2 are perfect matching transistors, the current (I) out of transistor MM2 will mirror the same amount of current out of transistor MM1.

By providing a moving current mirror formed using MOS devices, the current bearing ratio is less and therefore, response of the driver can be fast as is needed in 100 BASE-TX mode. However, as noted, above, a fast response is not needed in 10 BASE-T mode. In addition, a higher gain is necessary in 10 BASE-T mode as compared with the 100 BASE-TX mode. Thus, a driver used for the 100 BASE-TX mode would not satisfy requirements of the 10 BASE-T mode. Consequently, two separate drivers would be used for the separate modes, each designed to effect the important factors of the respective mode.

In order to simplify the circuitry and its manufacture, both drivers would use the basic design of the conventional driver 30. In order to increase the gain factor of the conventional driver 30 (as is needed in 10 BASE-T mode as compared to 100 BASE-TX mode), additional MM2 transistors can be provided in parallel. FIG. 5A(2) depicts a driver 30' with a third transistor MM3, in parallel with transistor MM2, used to double the amount of output current to satisfy the requirements of the 10 BASE-T mode. Transistors MM2 and MM3 are similar to two parallel current sources for summing node NA, and provide twice the amount of current (2I). If additional mirror transistors are added, current gain would further increase. This driver configuration, however, is unsuitable for use in the 100 BASE-TX mode as it does not have a fast enough response.

Thus, two separate drivers would be provided in the driver stage, each dedicated to operate only in the respective mode. However, such arrangement increases the chip area needed for the driver stage. Consequently, there is a need to provide a single driver that can operate in both 10 BASE-T mode and 100 BASE-TX mode and effect the important factors for each mode.

DISCLOSURE OF THE INVENTION

The invention provides a novel driver with a switchable gain to be compatible with both 10 BASE-T and 100 BASE-TX Ethernet networks. The driver includes a first circuit operable in both low and high transmission frequency modes and connected to (i) a potential source, (ii) an input node receiving an input current. and (iii) an output node, and a second circuit operable in only the high transmission frequency mode and connected to the potential source and controllably connected to the input node. In the low transmission frequency mode, the potential source is at a first level, and the first circuit receives the input current and provides a first output current with a first current gain to the output node. In the high transmission frequency mode, the potential source is at a second, lower level and the first and second circuits receive the input current and provide a second output current, less than the first output current, with a second current gain, lower than the first current gain, to the output node.

In accordance with one aspect of the invention, the first circuit is a current mirror having a first transistor and a second transistor. The first transistor has a first conductor connected to the potential source, a second conductor connected to the input node and a gate connected to the input node. The second transistor has a first conductor connected to the potential source, a second conductor connected to the output node and a gate connected to the gate of the first transistor.

In accord with another aspect of the invention, the second circuit comprises a third transistor having a first conductor connected to the potential source, a second conductor connected to the input node, and a gate controllably connected to the input node.

Various objects and features of the present invention will become more readily apparent to those skilled in the art from which the following description of a specific embodiment thereof, especially when taken in conjunction with the accompanying drawings.

BRIEF DESCRIPTION OF THE DRAWINGS

FIGS. 5A(1) and 5A(2) are circuit diagrams of a conventional current mirror circuit.

BEST MODE FOR PRACTICING THE INVENTION

Figure 6:
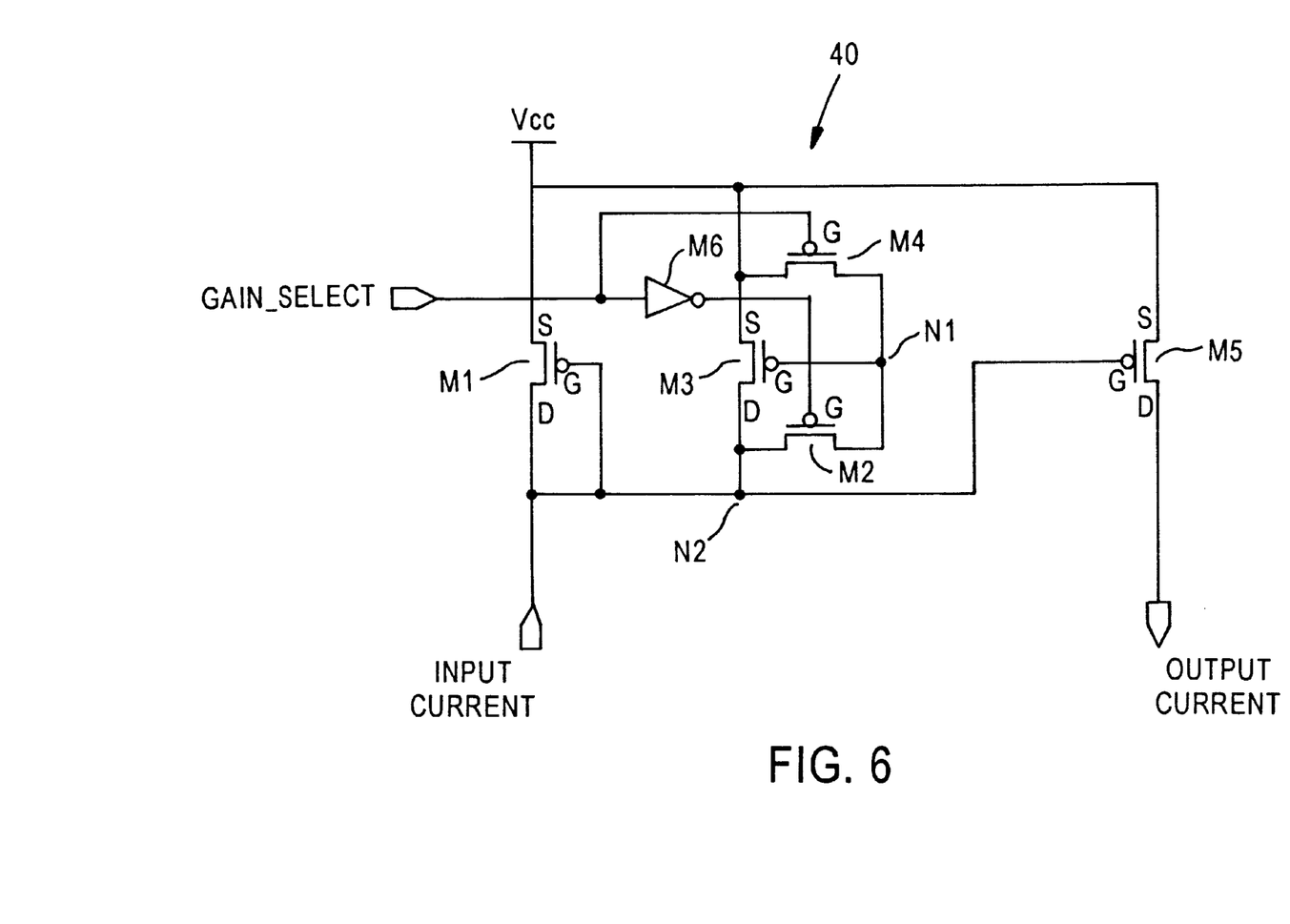
FIG. 6 is a diagram of a driver circuit constructed in accordance with embodiments of the present invention.

The driver of the present invention is capable of operating in the 10 BASE-T mode, providing a high gain and slow response, and in the 100 BASE-TX mode, providing low gain and a fast response. FIG. 6 shows a driver 40 in accordance with the present invention. The driver 40 employs current mirror structure to provide a current gain of 1:16 when in the 10 BASE-T mode, and a parallel current source controlled to be operated only in the 100 BASE-TX mode. In the 100 BASE-TX mode with the parallel current source active, a gain of 2:16 is obtained which effectively provides a gain of 1:8 (less than the 10 BASE-T mode). The doubling of the current devices produces twice as much current output. This doubled up arrangement of current devices can respond effectively at twice the rate because, even though current is being pulled out of the driver circuit 40, driver circuit 40 has to pull its own charge.

In the driver circuit 40 of FIG. 6, the doubling of the current devices (shown as MOS transistors M1 and M3) allows the driver circuit 40 to turn off at twice the rate as compared to when transistor M3 is not active. Therefore, response time is cut in half when transistor MM3 is active as compared to when it is not active.

In 10 BASE-T mode, the extra current source is not active and there is a high current ratio (1:16). Hence, there is more current being mirrored on the secondary side (MOS transistor M5) relative to the current in the primary side (MOS transistor M1).

In 10 BASE-T mode, the extra current source is not active and there is a high current ratio (1:16). Hence, there is more current being mirrored on the secondary side (MOS transistor M5) relative to the current in the primary side (MOS transistor M1). With response time being based on the higher mirrored current, the response is slower with the higher ratio, as is preferred in the 10 BASE-T mode.

In the 100 BASE-TX mode, MOS transistor M3 is electrically connected to the primary side (MOS transistor M2 at node N2) which changes the gain ratio to 2:16, net ratio 1:8 as previously noted. While this operating mode produces a lower current gain, since there is a lower current drive, the effect is a faster response as preferred for 100 BASE-TX mode.

As shown in FIG. 6, the driver circuit 40 includes P-channel MOS transistors M1, M2, M3, M4, M5 and inverter M6. The operation of driver circuit 40 will now be explained.

When the GAIN-SELECT value is "0", the circuit 40 switches to 10 BASE-T mode. More specifically, the "0" value of GAIN-SELECT turns transistor M4 ON and connects node N1 to $V_{cc}$. When GAIN-SELECT is a "0" and inverter M6 outputs a 1, MOS transistor M2 turns OFF. Thus, MOS transistor M4 is ON and MOS transistor M2 is OFF which isolates node N1 from node N2 and connects the gate of MOS transistor M3 to $V_{cc}$. Therefore, the MOS transistor M3 has no gate-to-source voltage so that no current flows through the MOS transistor M3 to node N2. At this point, the MOS transistor M3 is acting as an electrical isolator since it still has capacitance, but is not supplying any current.

When the GAIN-SELECT is "1", the circuit 40 is switched to 100 BASE-TX mode.

The MOS transistor M4 is turned OFF and inverter M6 will output a "0" to MOS transistor M2, causing it to conduct and connect nodes N1 and N2 together. When this occurs, MOS transistors M3 and M2 are effectively in parallel because the gate of MOS transistor M3 at node N1 is attached to its own drain at N2 just like the primary current mirror MOS transistor M1. If these primary current mirrors, MOS transistors M1 and M2, are the same size, the current ratio will be 2:16 or 1:8 for MLT-3 (100 BASE-TX) mode.

Figure 7A:
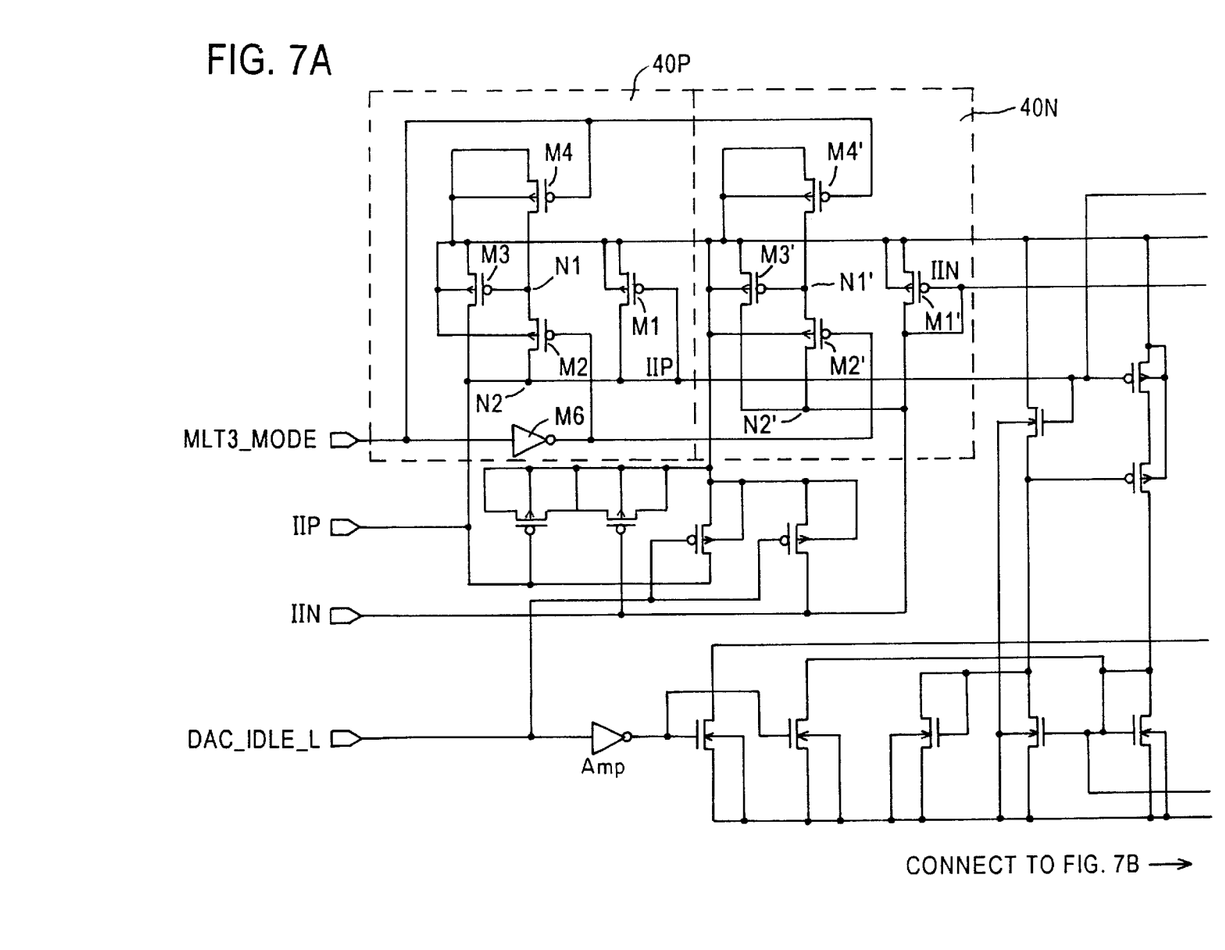
FIGS. 7A and 7B together form a schematic diagram of a circuit for outputting a differential pair of signals using the driver circuit of FIG.6.
Figure 7B:
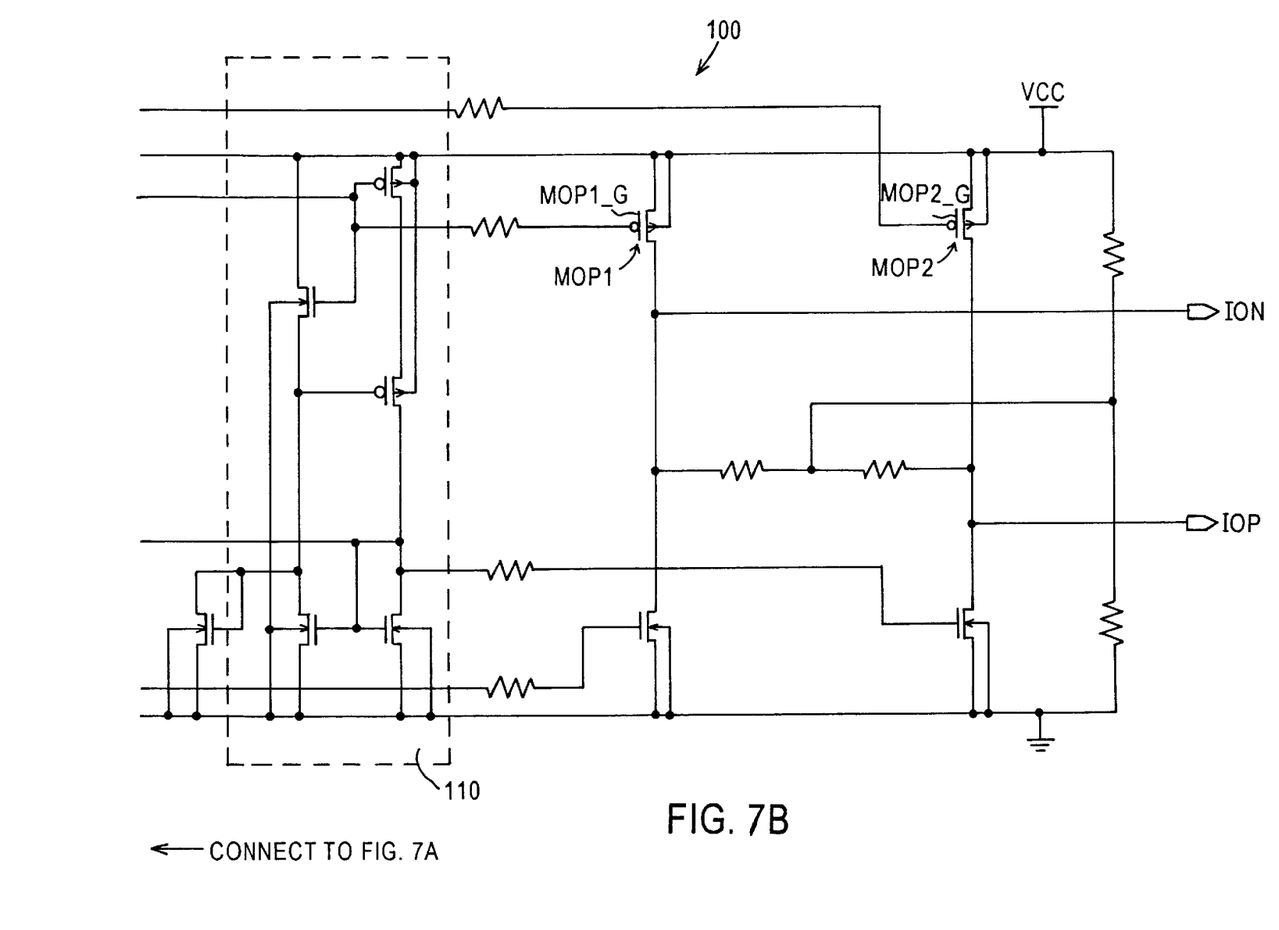

The driver circuit 40 of FIG. 6 is a driver for one input. Since the data for a LAN network is output as differential output pairs, two parallel driver circuits 40 are needed in an overall data output driver circuit 100 as shown in the embodiment of FIGS. 7A and 7B. In this arrangement, there is a driver circuit 40N that drives the negative half of the waveform and a driver circuit 40P that drives the positive half of the waveform. Thus, the circuit 40 of FIG. 6 is repeated so that there is a circuit that drives the positive half of The waveform and a circuit that drives the negative half of the waveform. FIG. 7A shows input "IIP" which is the input current "positive" and "IIN" which is input current "negative". The positive driver circuit 40P drives the gate MOP2_G of transistor MOP2 (FIG. 7B) and the negative driver circuit 40N drives the gate MOP1_G of transistor MOP1 (FIG. 7B) each of which corresponds to transistor M5 of FIG. 6. The circuit 100 mirrors the current from the positive to the negative, then back to positive, enabling current mirror amplification for both circuits 40P and 40N.

Figure 8:
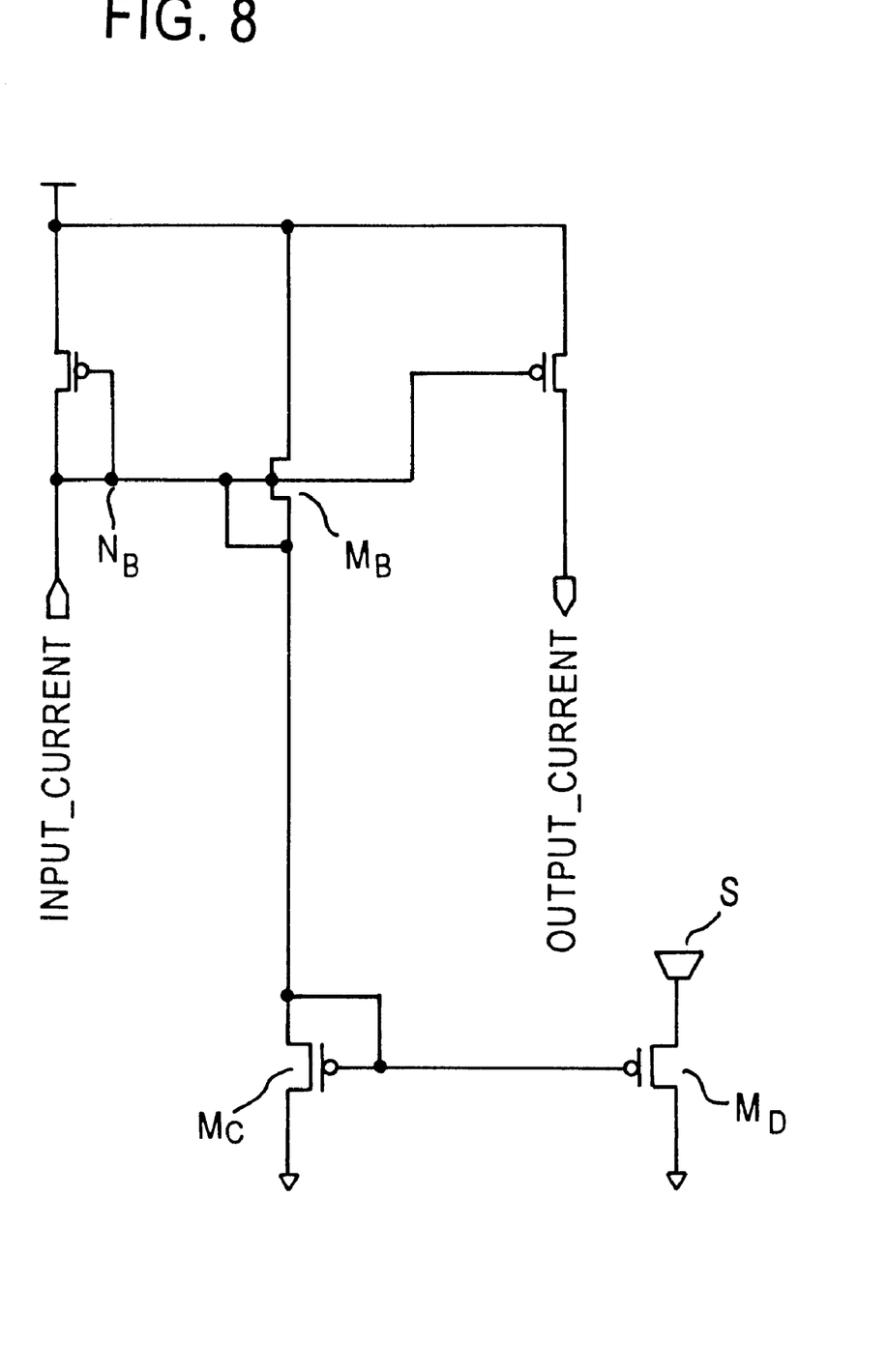
FIG. 8 is a higher level depiction of the output circuit of FIGS. 7A and 7B.

A simplified depiction of circuit 100 is provided in FIG. 8. As shown, a certain size MOS transistor $M_B$ is tapped on the gate to source voltage which is mirrored down to another MOS transistor $M_C$. which is amplified at MOS transistor $M_D$ and becomes a sinking current. Hence, while $M_C$ is sourcing current, $M_D$ is sinking current at node S. Thus, the driver circuits 40P and 40N provide a symmetric current driver as sinking and sourcing occur at the same time to produce a current. At a certain voltage, current is being injected when positive and current is being pulled from the negative side. Consequently, there is no net rising of capacitance as the common node point does not change. Hence the drivers 40P and 40N are driving out a differential signal.

There accordingly has been described a driver with a switchable gain to be compatible with both 10 BASE-T and 100 BASE-TX Ethernet networks. The driver includes a first circuit operable in both low and high transmission frequency modes and a second circuit operable in only the high transmission frequency mode. In the low transmission frequency mode, the potential source is at a first level, and the first circuit receives an input current and provides a first output current with a first current gain to an output node. In the high transmission frequency mode, the potential source is at a second, lower level and the first and second circuits receive the input current and provide a second output current, less than the first output current, with a second current gain, lower than the first current gain, to the output node.

Since only a single driver circuit is used that provides driving in two different modes, separate drivers are not required. This reduces the chip area required by the driver stage.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative way, rather than in a restrictive sense. For example, although the driver circuit of the present invention is shown using P channel MOS transistors, the driver circuit can be formed using N channel MOS transistors so that instead of sinking current, it is sourced. Use of N channel MOS transistors would require flipping the P channel driver circuit in a manner well understood by those skilled in the art.

What is claimed is:

1. A transmission line driver operable in low and high frequency transmission modes, comprising:
    low transmission frequency mode circuitry that receives a first input current and generates a first output current with a first current gain;
    high transmission frequency mode circuitry that receives a second input current, different from the first input current, and generates a second output current that is less than the first output current and with a second current gain that is less than the first current gain; wherein
    the transmission line driver is responsive to a control signal designating the low transmission frequency mode to cause the low transmission frequency mode circuitry to generate the first output current and to the control signal designating the high transmission frequency mode to cause the high transmission frequency mode circuitry to generate the second output current.

2. The driver according to claim 1, wherein the low frequency mode circuitry comprises a current mirror.

3. The driver according to claim 2, wherein the current mirror includes a first transistor and a second transistor, the first transistor having a source coupled to a voltage source, and a drain and a gate coupled to a conductor receiving the first current during the low frequency mode and the second current during the high frequency mode, the second transistor having a source coupled to the voltage source, a gate coupled to the conductor connected to the drain and gate of the first transistor, and a drain at which the first and second output currents are generated.

4. The driver according to claim 3, wherein the high frequency mode circuitry comprises the current mirror and a third transistor that is connected in parallel to the first transistor, with a source coupled to the voltage source, a drain coupled to the conductor connected to the drain and gate of the first transistor, and a gate that is controllably coupled to the conductor connected to the drain and gate of the first transistor.

5. The driver according to claim 4, further comprising control circuitry coupled to the gate of the third transistor to control the operation of the third transistor such that the gate of the third transistor is coupled to the conductor connected to the drain and gate of the first transistor only during the high frequency mode.

6. The driver according to claim 5, wherein the control circuitry comprises a fourth transistor coupled between the voltage source and the gate of the third transistor and having a gate receiving the control signal designating the low or high frequency mode, a fifth transistor connected between the gate of the third transistor and to the drain and gate of the first transistor, an inverter having an input receiving the control signal and an output connected to the gate of the fifth transistor.

7. The driver according to claim 6, wherein
    in the low frequency mode, the fourth transistor is ON and the third and fifth transistors are OFF, and
    in the high frequency mode, the fourth transistor is OFF and the third and fifth transistors are ON.

8. A transmission line driver operable in a low transmission frequency mode and a high transmission frequency mode, comprising:
    a first circuit operable in both the low and high transmission frequency modes and connected to (i) a potential source, (ii) an input node receiving an input current, and (iii) an output node providing an output current, and
    a second circuit operable in only the high transmission frequency mode and connected to the potential source and controllably connected to the input node.

9. The driver according to claim 8, wherein
    the first circuit is a current mirror having a first transistor and a second transistor, said first transistor having a first conductor connected to said potential source, a second conductor connected to said input node and a gate connected to said input node, and said second transistor having a first conductor connected to said potential source, a second conductor connected to said output node and a gate connected to said input node.

10. The driver according to claim 9, wherein
    the second circuit comprises a third transistor having a first conductor connected to said potential source, a second conductor connected to the input node, and a gate controllably connected to the input node,
    in said low transmission frequency mode
        said potential source is at a first level,
        a first input current is provided to said input node, and
        said first circuit provides a first output current with a first current gain to said output node, and
    in said high frequency mode,
        said potential source is at a second lower level,
        a second lower input current is provided to said input node, and said first and second circuits provide a second output current less than the first output current, with a second current gain lower than the first current gain, to said output node.

11. The driver according to claim 10, wherein the second circuit further comprises
an inverter receiving a transmission frequency mode selection signal and outputting an inverted transmission frequency mode selection signal,
a fourth transistor having a first conductor connected to the potential source, a second conductor connected to the gate of the third transistor and a gate receiving the transmission frequency mode selection signal, and
a fifth transistor having a first conductor connected to the input node, a second conductor connected to the gate of the third transistor and the second conductor of the fourth transistor, and a gate receiving the inverted transmission frequency mode selection signal.

12. The driver according to claim 11, wherein the first through fifth MOS transistors are all the same type MOS transistor.

13. The driver according to claim 8, wherein the low transmission frequency mode is 10 Mb/s and the high transmission frequency mode is 100 Mb/s.

14. The driver according to claim 13, wherein in the low transmission frequency mode the driver has to drive about 1.8 to 2.5 volts, and in the high transmission frequency mode, the driver has to drive about 1 volt.

15. A network line driver configured for receiving a differential pair of signals and driving said differential pair of signals onto a network medium, comprising:
a first driver circuit receiving a first current signal as a signal of said differential pair of signals, and including
a first circuit operable in both a low transmission frequency mode and a high transmission frequency mode and connected to (i) a potential source, (ii) a first input node receiving said first current signal, and (iii) a first output node providing a first output current, and
a second circuit operable in only the high transmission frequency mode and connected to the potential source and controllably connected to the first input node; and
a second driver circuit receiving a second current signal as another signal of said differential pair of signals, and including
a third circuit operable in both the low and high transmission frequency modes and connected to (i) the potential source, (ii) a second input node receiving said second current signal, and (iii) a second output node providing a second output current, and
a fourth circuit operable in only the high transmission frequency mode and connected to the potential source and controllably connected to the second input node.

16. The network line driver according to claim 15, wherein
the first circuit of the first driver is a current mirror having a first transistor and a second transistor, said first transistor has a first conductor connected to said potential source, a second conductor connected to said first input node and a gate connected to said first input node, and said second transistor has a first conductor connected to said potential source, a second conductor connected to said first output node and a gate connected to the first input node; and the third circuit of the second driver is a current mirror having a third transistor and a fourth transistor, said third transistor has a first conductor connected to said potential source, a second conductor connected to said second input node and a gate connected to said second input node, and said fourth transistor has a first conductor connected to said potential source, a second conductor connected to said second output node and a gate connected to the second input node.

17. The network line driver according to claim 16, wherein
the second circuit of the first driver comprises a fifth transistor having a first conductor connected to said potential source, a second conductor connected to the first input node, and a gate controllably connected to the first input node,
in said low transmission frequency mode
said potential source is at a first level,
a first input current is provided to said first input node, and
said first circuit provides a first output current with a first current gain to said first output node, and
in said high frequency mode,
said potential source is at a second lower level,
a second lower input current is provided to said first input node, and
said first and second circuits provide a second output current less than the first output current, with a second current gain lower than the first current gain, to said first output node; and
the fourth circuit of the second driver comprises a sixth transistor having a first conductor connected to said potential source, a second conductor connected to the second input node, and a gate controllably connected to the second input node,
in said low transmission frequency mode
said potential source is at the first level,
the first input current is provided to said second input node, and
said third circuit provides the first output current with the first current gain to said second output node, and
in said high frequency mode,
said potential source is at the second level,
the second input current is provided to said second input node, and
said third and fourth circuits provide the second output current with the second current gain to said second output node.

18. The network line driver according to claim 17, wherein
the second circuit of the first driver further comprises
an inverter receiving a transmission frequency mode selection signal and outputting an inverted transmission frequency mode selection signal,
a seventh transistor having a first conductor connected to the source of potential, a second conductor connected to the gate of the fifth transistor and a gate receiving the transmission frequency mode selection signal, and
a eighth transistor having a first conductor connected to the first input node, a second conductor connected to the gate of the fifth transistor and to the second conductor of the seventh transistor, and a gate receiving the inverted transmission frequency mode selection signal; and the fourth circuit of the second driver further comprises
a ninth transistor having a first conductor connected to the source of potential, a second conductor connected to the gate of the sixth transistor and a gate receiving the transmission frequency mode selection signal, and
a tenth transistor having a first conductor connected to the second input node, a second conductor connected to the gate of the sixth transistor and to the second conductor of the ninth transistor, and a gate receiving the inverted transmission frequency mode selection signal from the second circuit of the first driver.

19. The network driver according to claim 18, wherein the first through tenth MOS transistors are all the same type MOS transistor.

20. The network line driver according to claim 15, wherein the low transmission frequency mode is 10 Mb/s and the high transmission frequency mode is 100 Mb/s.

21. The network line driver according to claim 20, wherein in the low transmission frequency mode the first and second drivers have to drive about 1.8 to 2.5 volts, and in the high transmission frequency mode, the first and second drivers have to drive about 1 volt.

* * * * *